US010834118B2

(12) United States Patent
Bagheri et al.

(10) Patent No.: US 10,834,118 B2
(45) Date of Patent: Nov. 10, 2020

(54) AMBIGUITY RESOLUTION SYSTEM AND METHOD FOR SECURITY INFORMATION RETRIEVAL

(71) Applicant: International Business Machines Corporation, Armonk, NY (US)

(72) Inventors: Ebrahim Bagheri, Toronto (CA); Mohammadreza Barouni Ebrahimi, Ottawa (CA); Samaneh Bayat, Ottawa (CA); Zeinab Noorian, Toronto (CA)

(73) Assignee: International Business Machines Corporation, Armonk, NY (US)

( * ) Notice: Subject to any disclaimer, the term of this patent is extended or adjusted under 35 U.S.C. 154(b) by 227 days.

(21) Appl. No.: 15/837,061

(22) Filed: Dec. 11, 2017

(65) Prior Publication Data

US 2019/0182285 A1    Jun. 13, 2019

(51) Int. Cl.
*H04L 29/06* (2006.01)
*G06F 9/44* (2018.01)
(Continued)

(52) U.S. Cl.
CPC .......... *H04L 63/1433* (2013.01); *G06F 9/44* (2013.01); *G06F 11/362* (2013.01);
(Continued)

(58) Field of Classification Search
CPC ... H04L 63/1433; H04L 63/1483; G06F 9/44; G06F 11/362; G06F 11/3672;
(Continued)

(56) References Cited

U.S. PATENT DOCUMENTS 8,909,648 B2 * 12/2014 El-Yaniv .................. G06N 5/02
                                                         707/739
9,607,087 B1 *  3/2017 Ofek ..................... G06F 16/951
(Continued)

OTHER PUBLICATIONS

Naresh Kumar Nagwani, Weight Similarity Measurement Model Based, Objected Oriented Approach for Bug Databases Mining to Detect Similar and Duplicate Bugs, dated Jan. 23-24, 2009, ACM, New York, pp. 202-207, 6 pages, (Year: 2017).*
(Continued)

*Primary Examiner* — Phong H Nguyen
(74) *Attorney, Agent, or Firm* — Yee & Associates, P.C.

(57) ABSTRACT

A method for ambiguity resolution in retrieving security information. A unified representation model utilizing the security information mined from a group of sources is generated by a computer system, wherein the unified representation model represents terms in the security information using vectors that describe locations in space for the terms. Distances between the terms indicate correlations between the terms, and the terms are for security concepts in the security information. The computer system represents the security concepts utilizing a group of weighted graphs that identifies semantic-relatedness between the terms utilizing the vectors in the unified representation model, wherein the group of weighted graphs enables interpreting queries with reduced ambiguity. The computer system interprets a seed query utilizing the group of weighted graphs. The computer system retrieves a portion of the security information utilizing the seed query interpreted utilizing the group of weighted graphs.

19 Claims, 6 Drawing Sheets

(51) Int. Cl.
  *G06F 11/36* (2006.01)
  *G06F 8/73* (2018.01)
  *G06F 16/2457* (2019.01)
  *G06F 21/57* (2013.01)
(52) U.S. Cl.
  CPC ........ *G06F 11/3672* (2013.01); *G06F 21/577* (2013.01); *G06F 8/73* (2013.01); *G06F 16/24578* (2019.01); *G06F 2221/034* (2013.01); *H04L 63/1483* (2013.01)
(58) Field of Classification Search
  CPC ................. G06F 16/24578; G06F 8/73; G06F 2221/034; G06F 21/577
  USPC ........................................ 707/722, 748, 798
  See application file for complete search history.

(56) References Cited

U.S. PATENT DOCUMENTS

| | | | | |
|---|---|---|---|---|
| 2005/0102534 A1* | 5/2005 | Wong | ................... | G06F 21/577 726/4 |
| 2009/0007272 A1* | 1/2009 | Huang | ................... | G06F 21/57 726/26 |
| 2011/0219360 A1* | 9/2011 | Srinivasa | ................ | G06F 16/00 717/124 |
| 2012/0210435 A1* | 8/2012 | Niemela | ................ | G06F 21/645 726/26 |
| 2015/0363294 A1* | 12/2015 | Carback, III | ............. | G06F 8/37 717/132 |
| 2016/0378993 A1* | 12/2016 | McGee | ............. | G06F 16/24578 726/25 |
| 2018/0054452 A1* | 2/2018 | Muddu | ............... | H04L 63/1416 |

OTHER PUBLICATIONS

Nagwani et al., "Weight similarity measurement model based, object oriented approach for bug databases mining to detect similar and duplicate bugs," ACM Digital Library, Proceedings of the International Conference on Advances in Computing, Communication and Control, Mumbai, India, Jan. 2009, pp. 202-207, accessed Dec. 4, 2017, 1 page.

\* cited by examiner

AMBIGUITY RESOLUTION SYSTEM AND METHOD FOR SECURITY INFORMATION RETRIEVAL

BACKGROUND

1. Field

The disclosure relates generally to an improved data processing system and, more specifically, to retrieving security information. Still more particularly, the present disclosure relates to a method, an apparatus, and a computer program product for reducing ambiguity in retrieving security information.

2. Description of the Related Art

Although application security is a well-established field, commonly used terminology does not exist for the general terms used in the field or for the details that describe security vulnerabilities found in the context of applications. One solution employed includes selecting a single security product for their application security testing. With the selection of the product, a security analyst or other user is trained on that selected product and utilizes the terminology for that product.

However, with the increase in complexity of attacks and the raised awareness towards importance of application security, organizations use a multitude of scanners to test their applications from different angles. For example, the testing can include both static analysis and dynamic analysis. Further, in the past, the scanning was performed utilizing desktop applications and with results were stored in a separate machine for each specific application. Applications such as security information and event management systems are used in large organizations to perform security scans of all their applications for analysis. In this manner, the security status of an entire organization can be assessed and management can be performed for the organization.

When security testing results are gathered from various scanners utilizing different technologies into one system, retrieval of information is burdened by the differences in terminologies. For example, the item that is the result of security testing is referenced using different terms by different products. These terms include, for example: a security incident, a finding, a security finding, a vulnerability, an issue, or other terms. The details that describe this type of item also differ depending on both the technology used and the terminology used by the scanner tool. For example, the technology used can be dynamic scanning or static scanning. With respect to the terminology for a particular scanning tool, the information about where in the application a security issue is found may be called a location, a module, an application programming interface (API), or some other term.

Even the facts about security issues that are independent of the scanning tool or technology are represented differently due to lack of exact industry standard or abbreviations. For example, a type of a vulnerability could be called cross-site scripting or XSS. In addition, the people who search for information in the security management system may not be familiar with the standard terminology or the terms used by the scanning tools. This situation also adds to the complexity of information retrieval.

SUMMARY

According to one embodiment of the present invention, a method for ambiguity resolution in retrieving security information is present. A unified representation model utilizing the security information mined from a group of sources is generated by a computer system. The unified representation model represents terms in the security information using vectors that describe locations in space for the terms. Distances between the terms indicate correlations between the terms, and the terms are for security concepts in the security information. The computer system represents the security concepts utilizing a group of weighted graphs that identifies semantic-relatedness between the terms utilizing the vectors in the unified representation model. The group of weighted graphs enables interpreting queries with reduced ambiguity. The computer system interprets a seed query utilizing the group of weighted graphs. The computer system retrieves a portion of the security information utilizing the seed query interpreted utilizing the group of weighted graphs.

According to another embodiment of the present invention, a security system comprises a computer system and a query processor running on the computer system. The query processor receives a seed query for security information, and interprets the seed query to form an expanded query by enriching terms in the seed query with additional terms for similar security concepts through utilizing a group of weighted graphs of semantically-related security concepts in which the group of weighted graphs identifies semantic relatedness between the terms utilizing vectors in a unified representation model in which the vectors describe locations in space for the terms, and in which distances between the terms indicate correlations between the terms, in which the terms are for security concepts in the security information. The query processor retrieves a portion of the security information utilizing the expanded query.

According to yet another embodiment of the present invention, a computer program product for ambiguity resolution in retrieving security information is present. The computer program product comprises a computer-readable storage media, first program code, second program code, third program code, and fourth program code. The first program code, stored on the computer-readable storage media, generates a unified representation model using security information mined from a group of sources. The unified representation model represents terms in the security information using vectors that describe locations in space for the terms. The distances between the terms indicate correlations between the terms, and the terms are for security concepts in the security information. The second program code, stored on the computer-readable storage media, represents the security concepts utilizing a group of weighted graphs that identifies semantic-relatedness between the terms utilizing the vectors in the unified representation model. The group of weighted graphs enables interpreting queries with reduced ambiguity. The third program code, stored on the computer-readable storage media, interprets a seed query utilizing the group of weighted graphs. The fourth program code, stored on the computer-readable storage media, retrieves a portion of the security information utilizing the seed query interpreted utilizing the group of weighted graphs.

DETAILED DESCRIPTION

Figure 1:
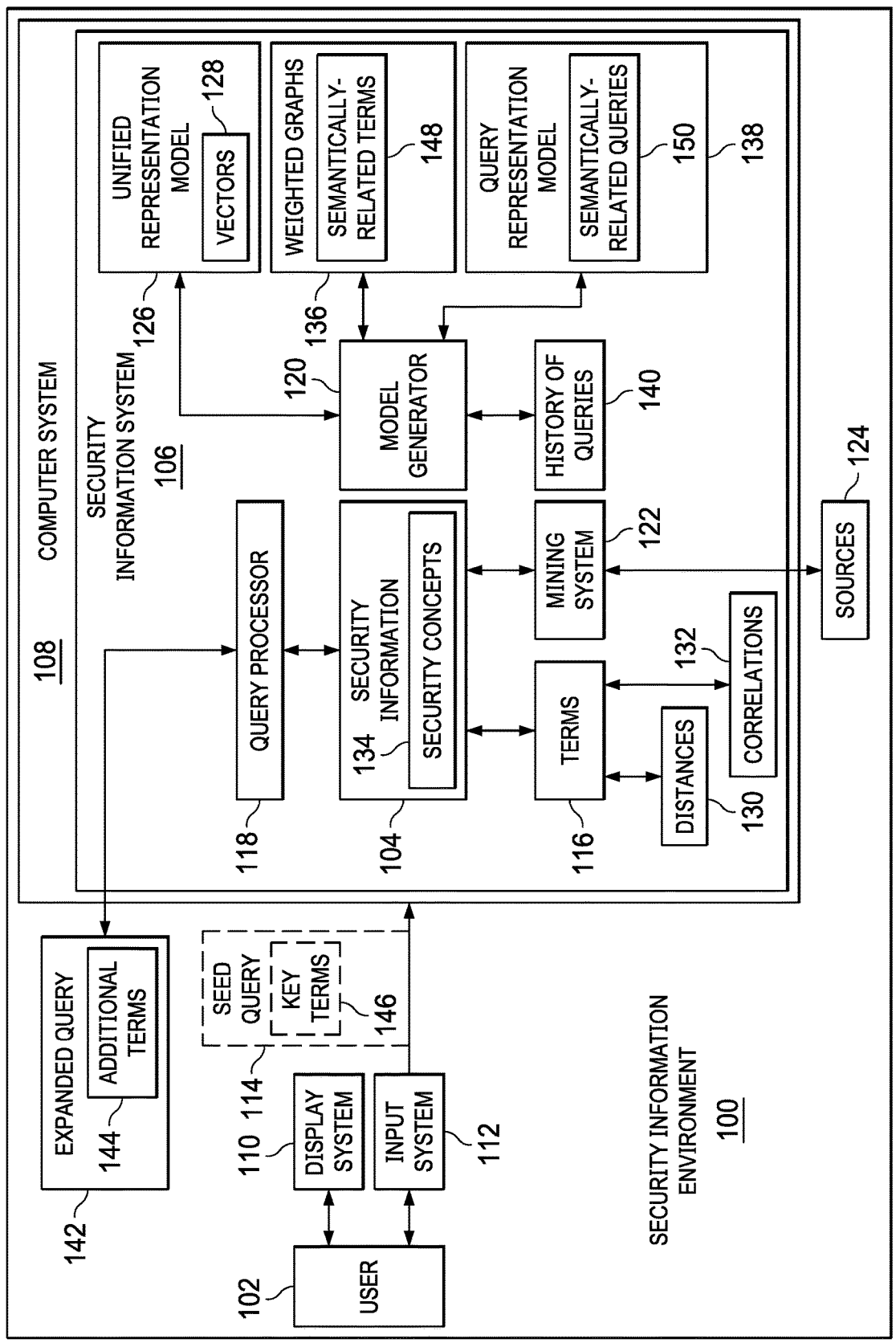
FIG. 1 is a block diagram of a security information environment in accordance with an illustrative embodiment.

The present invention may be a system, a method, and/or a computer program product. The computer program product may include a computer-readable storage medium (or media) having computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present invention.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer-readable program instructions.

These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The illustrative embodiments recognize and take into account that it would be desirable to have a method, an apparatus, and a computer program product that enables reducing ambiguity in the use of terms utilized in queries to search for security information. The illustrative embodiments recognize and take into account that it would be desirable to have a method and apparatus to resolve ambiguities for information received from different types of security scanning tools and technologies.

Thus, the illustrative embodiments provide a method, an apparatus, and a computer program product for ambiguity resolution treating security information. In one illustrative example, the process generates a unified representation model using security information mined from a group of sources. The unified representation model represents terms in the security information using vectors that describe locations in space for the terms, and distances between the terms indicates correlations between the terms. In other words, as the distance between two terms decreases, the correlation between those two terms increases. As depicted, these terms are for security concepts in the security information.

The security concepts are represented utilizing a group of weighted graphs that identify semantic-relatedness between the terms. The group of weighted graphs can be generated utilizing the vectors in the unified representation model, wherein the group of weighted graphs enables interpreting queries with reduced ambiguity. As used herein, "a group of," when used with reference to items, means one or more items. For example, "a group of sources" is one or more sources.

With reference now to the figures and, in particular, with reference to FIG. 1, a block diagram of a security information environment is depicted in accordance with an illustrative embodiment. As depicted, security information environment 100 is an environment in which user 102 can obtain access to security information 104 utilizing security information system 106.

As depicted, security information system 106 is located in computer system 108. Computer system 108 is a physical hardware system that includes one or more data processing systems. When more than one data processing system is present, those data processing systems may be in communication with each other using a communications medium. The communications medium may be a network. The data processing systems may be selected from at least one of a computer, a server computer, a workstation, a tablet computer, a laptop computer, a mobile phone, or some other suitable data processing system.

In the illustrative example, user 102 can interact with security information system 106 through display system 110 and input system 112. Display system 110 is a physical hardware system and includes one or more display devices on which a graphical user interface may be displayed. The display devices may include at least one of a light emitting diode (LED) display, a liquid crystal display (LCD), an organic light emitting diode (OLED) display, or some other suitable device on which the graphical user interface can be displayed. User 102 can interact with the graphical user interface through user input generated by input system 112 for computer system 108. Input system 112 is a physical hardware system and may be selected from at least one of a mouse, a keyboard, a trackball, a touchscreen, a stylus, a motion sensing input device, a cyber glove, or some other suitable type of input device.

As depicted, user 102 generates seed query 114 utilizing input system 112. Security information system 106 receives seed query 114 and can return a portion of security information 104 to user 102 utilizing seed query 114 to search for security information 104. For example, the portions of security information 104 returned to user 102 can be displayed on display system 110.

Security information system 106 is configured to process seed query 114 in a manner that reduces ambiguity in terms 116 in security information 104. In the illustrative example, a term in terms 116 can be a word or phrase used to express a security concept in security information system 106.

The reduction in ambiguity in terms 116 when searching security information 104 is accomplished through a number of different components in security information system 106. In this illustrative example, these components in security information system 106 include query processor 118, model generator 120, and mining system 122.

As depicted, security information 104, including terms 116, are obtained utilizing mining system 122 in security information system 106. In this illustrative example, mining system 122 mines security information 104 and terms 116 in security information 104 used in relation to application security in an unsupervised manner from unstructured information available in the group of sources 124.

As used herein, "a group of," when used with reference to items, means one or more items. For example, "a group of sources 124" is one or more of sources 124. The group of sources comprises at least one of including repositories of a security management system, reference websites in a field of security, security blogs, security forums, security databases, or other suitable sources of security information.

As used herein, the phrase "at least one of," when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, without limitation, "at least one of item A, item B, or item C" may include item A, item A and item B, or item B. This example also may include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

The mining of security information 104 from sources 124 can be performed in a number of different ways. For example, web crawlers, spiders, Internet bots, data scrapers, browser automation tools, or other suitable tools may be used to obtain security information 104 from sources 124.

In the illustrative example, model generator 120 generates unified representation model 126 utilizing security information 104 mined from the group of sources 124. As depicted, unified representation model 126 represents terms 116 in security information 104 utilizing vectors 128 that describe locations in space for terms 116, wherein distances 130 between terms 116 indicates correlations 132 between terms 116. In the illustrative example, terms 116 are for security concepts 134 in security information 104.

Additionally, model generator 120 also generates a group of weighted graphs 136 utilizing unified representation model 126. The group of weighted graphs identify the semantic relatedness between the terms utilizing the vectors in the unified representation model, wherein the group of weighted graphs represents the security concepts and wherein the group of weighted graphs enable interpreting queries with reduced ambiguity.

As depicted, model generator 120 also generates query representation model 138 for history of queries 140. The queries in history of queries 140 are represented utilizing vectors 128 to describe locations in space for the queries in history of queries 140.

In the illustrative example, query processor 118 receives seed query 114 from user 102 for security information 104. Query processor 118 interprets seed query 114 to form expanded query 142 by enriching key terms 146 in seed query 114 with additional terms 144 for similar security concepts through utilizing the group of weighted graphs 136 of semantically-related security concepts in which the group of weighted graphs 136 identifies semantic-relatedness between terms 116 utilizing vectors 128 in unified representation model 126. The adding of additional terms 144 to key terms 146 reduces issues with ambiguity in performing searches of security information 104.

In this example, key terms 146 are words or phrases that can be utilized in searching security information 104. Key terms 146 include words or phrases that can serves as a key to the meaning of another word or phrase. These terms are ones that are useful for performing a search of security information 104. Words that are too common to be useful in searching security information 104 are not key terms. For example, "the," "of," "are," and "this" are too common to be useful while performing a meaningful search of security information 104.

Query processor 118 retrieves a portion of security information 104 utilizing expanded query 142. The portion of security information 104 retrieved is displayed on display system 110 by query processor 118 in this illustrative example.

In this manner, ambiguity between terms 116 that are present for security information 104 can be reduced utilizing the different components in security information system 106. Different users may use different terms in seed query 114 to search for the same or similar security concepts. By identifying security concepts 134 that are similar to each other but described using different terms in terms 116, this relatedness between security concepts 134 is represented using vectors 128. In turn, vectors 128 are utilized to generate a group of weighted graphs 136. In this manner, seed queries utilizing different terms can result in the same or similar expanded queries that result in returning the desired security information to the users utilizing different terms.

In interpreting seed query 114, query processor 118 can find key terms 146 in seed query 114 and find semantically-related terms 148 to key terms 146 utilizing the group of weighted graphs 136. These key terms can be at least one of a word or phrase. Query processor 118 expands seed query 114 utilizing semantically-related terms 148 to form expanded query 142. Further, query processor 118 expands seed query 114 utilizing semantically-related queries 150 from query representation model 138.

As depicted, the expansion of key terms 146 in seed query 114 can occur in a number of different ways. For example, the expansion of seed query 114 to form expanded query 142 can occur utilizing at least one of semantically-related terms 148 identified in a group of weighted graphs 136, semantically-related terms 148 in query representation model 138, or semantically-related queries 150 in query representation model 138 to form expanded query 142. Thus, expanded query 142 incorporates semantically-related queries 150 from query representation model 138. Expanded query 142 also can incorporate semantically-related terms 148 from at least one of query representation model 138 or unified representation model 126.

Security information system 106, including query processor 118, model generator 120, and mining system 122, can be implemented in software, hardware, firmware, or a combination thereof. When software is used, the operations performed by security information system 106 may be implemented in program code configured to run on hardware, such as a processor unit. When firmware is used, the operations performed by security information system 106 may be implemented in program code and data and stored in persistent memory to run on a processor unit. When hardware is employed, the hardware may include circuits that operate to perform the operations in security information system 106.

In the illustrative examples, the hardware may take a form selected from at least one of a circuit system, an integrated circuit, an application specific integrated circuit (ASIC), a programmable logic device, or some other suitable type of hardware configured to perform a number of operations. With a programmable logic device, the device may be configured to perform the number of operations. The device may be reconfigured at a later time or may be permanently configured to perform the number of operations. Programmable logic devices include, for example, a programmable logic array, a programmable array logic, a field programmable logic array, a field programmable gate array, and other suitable hardware devices. Additionally, the processes may be implemented in organic components integrated with inorganic components and may be comprised entirely of organic components excluding a human being. For example, the processes may be implemented as circuits in organic semiconductors.

In one illustrative example, one or more technical solutions are present that overcome a technical problem with use of different terms with the same or similar security concepts. As a result, one or more technical solutions may provide a technical effect of reducing ambiguity between terms 116 utilized to search for similar security concepts in security information 104.

As a result, computer system 108 operates as a special purpose computer system in which security information system 106 in computer system 108 enables reducing ambiguity in searching security information 104 in which two or more different terms in terms 116 can reference the same or similar security concepts. In particular, one or more components in security information system 106 in computer system 108 transforms computer system 108 into a special purpose computer system as compared to currently available general computer systems that do not have one or more components of security information system 106.

Figure 2:
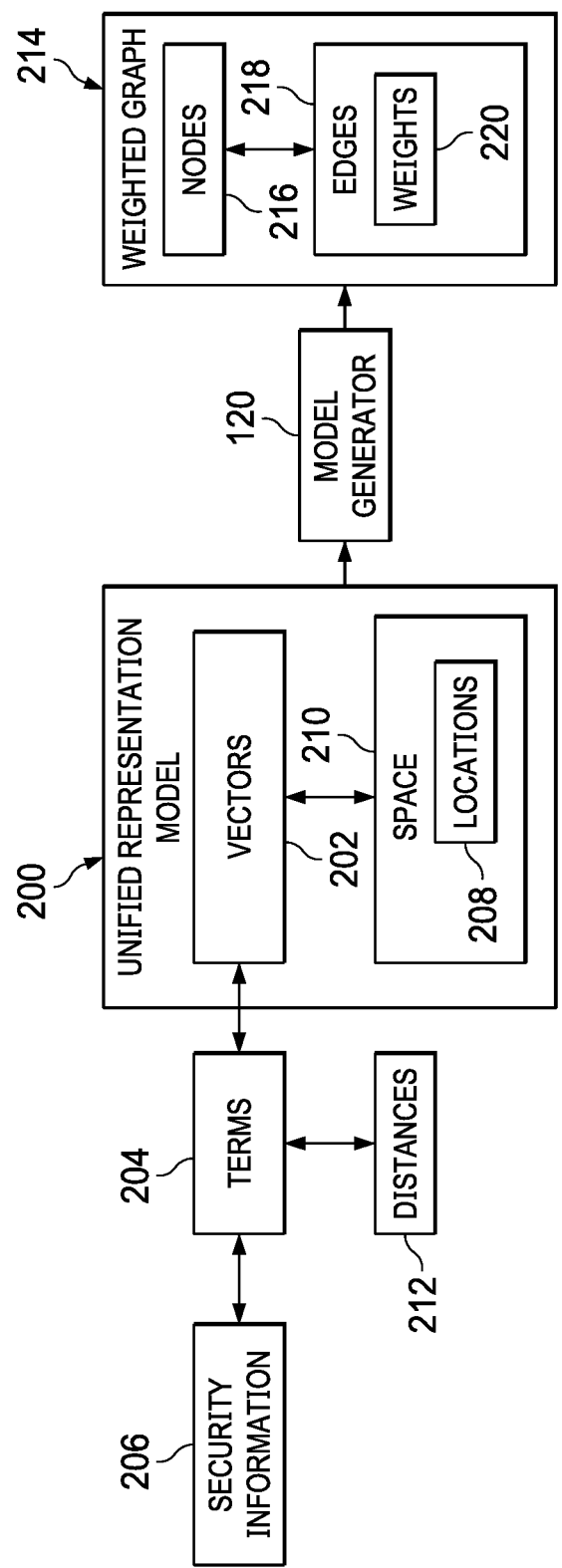
FIG. 2 is a block diagram illustrating creating a weighted graph from a unified representation model in accordance with an illustrative embodiment.

Turning next to FIG. 2, a block diagram illustrating creating a weighted graph from a unified representation model is depicted in accordance with an illustrative embodiment. In the illustrative examples, the same reference numeral may be used in more than one figure. This reuse of a reference numeral in different figures represents the same element in the different figures.

In this example, unified representation model 200 is an example of unified representation model 126 in FIG. 1.

Unified representation model 200 includes vectors 202 that represent terms 204 for security information 206. Vectors 202 represent locations 208 in space 210 for terms 204. As depicted, terms 204 have distances 212 based on locations 208 of vectors 202 representing terms 204.

As depicted, model generator 120 creates weighted graph 214 utilizing vectors 202 and unified representation model 200. Weighted graph 214 comprises nodes 216 and edges 218. Nodes 216 represent terms 204. Edges 218 represent correlations between nodes 216 that are connected by edges 218. In this example, edges 218 include weights 220. Weights 220 indicate the amount or strength of the correlations between nodes 216 connected by edges 218. In this illustrative example, weights 220 are selected based on distances 212. A smaller distance between two terms in terms 204 results in a higher weight for an edge connecting nodes 216 for those two terms in weighted graph 214.

Figure 3:
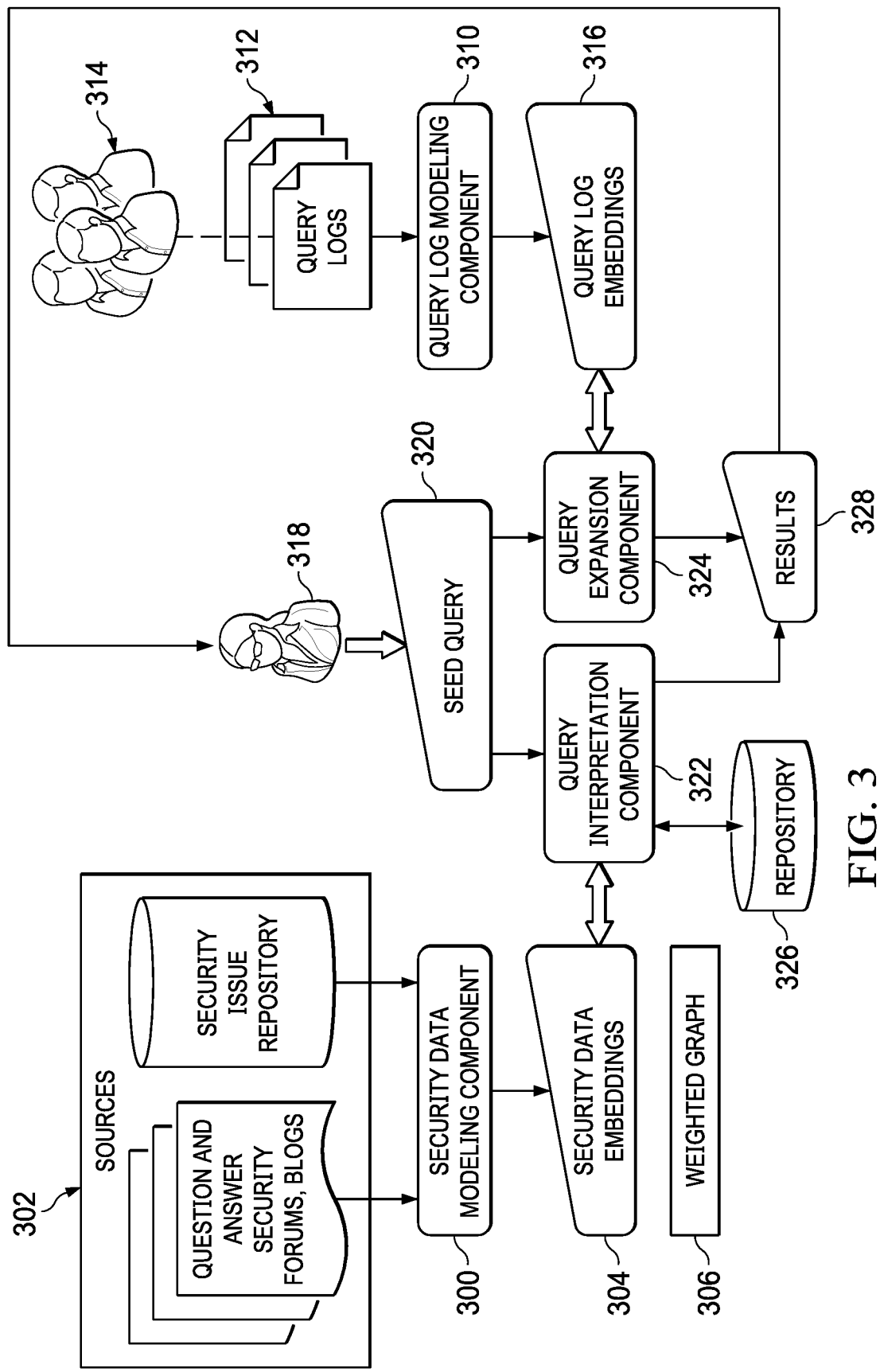
FIG. 3 is a dataflow for ambiguity resolution in retrieving security data in accordance with an illustrative embodiment.

With reference next to FIG. 3, a dataflow for ambiguity resolution in retrieving security data is depicted in accordance with an illustrative embodiment. In this example, security data modeling components 300 can be implemented utilizing model generator 120 and mining system 122 in FIG. 1. In this example, security data modeling component 300 is configured to obtain data from sources 302 such as a security issue repository, question-and-answer security forms, blogs, and other suitable sources. Security data modeling component 300 generates security data embeddings 304 utilizing the security information obtained from sources 302. Security data embeddings 304 contain vectors such as vectors 128 in unified representation model 126 in FIG. 1.

As depicted, security data embeddings 304 are created using word embedding techniques such as word2vec and global vector for word representation (GloVe). Security data embeddings 304 are vector representations for each word in an n-dimensional space. With this type of embedding, similar words are mapped to nearby locations. In other words, similar words may have distances that are less than some selected threshold. When performing word embedding from different sources, concatenation and canonical correlation analysis (CCA) techniques may be employed to maximize the correlation within security data embeddings 304. In concatenation approaches, different sets of embeddings are learned and appended to each other. Therefore, the length of the final embedding would be equal to the sum of each learned embedding. In the canonical correlation analysis techniques, multiple embeddings are built considering different input information.

In the illustrative example, security data embeddings 304 may be represented utilizing weighted graph 306. For example, weighted graph 306 can be G=(V, E), where V represents nodes and E represents edges. As depicted, nodes V are the security concepts C={c1, c2, . . . , cn} and edges E that represent relationships between these concepts are represented by the nodes V. The weight of the edges between the security concepts in the graph represents the degree of semantic-relatedness of the concepts.

As depicted, security data modeling component stores the security information in repository 326. As depicted, security data embeddings 304 can be utilized to search and identify security information stored in repository 326 in response to receiving queries of security information.

In the illustrative example, query log modeling component 310 accesses query logs 312. Query logs 312 are a history of queries made by users 314. Users 314 may be security analysts in this particular example. Query log modeling component 310 creates query log embeddings 316. These embedding are examples of vectors that can be found in query representation model 138 in FIG. 1.

In this depicted example, query logs 312 can be set Q of query logs with variable lengths obtained from users 314, where a query log q=(w1, w2, . . . , wM) Q is defined as a sequence of M words in q. D-dimensional real-valued representation for each query in the set of Q of query logs can be found such that similar queries lie nearby in the vector space. A word embedding model, such as a query2vec model, can map each query q to a unique vector and every word w in query q can be also mapped to a unique vector. For example, a query vector vq and a word vector vw would be concatenated to predict the next word in a context. Given Q as a training set, query2vec model can learn vector representation vq for each query q by combining two vectors: (1) a vector vq1 learned using a distributed bag of words algorithm (PVDBOW) and (2) a vector vq2 learned using a distributed memory algorithm (PV–DM). As a result, the query2vec model learns semantic-relatedness of different queries in query logs 312. In this example, query2vec model is a model used in a query representation approach called "query2vec."

In this illustrative example, user 318 can search security data embeddings 304 and create seed query 320. In this example, user 318 can be a security analyst, an IT manager, a customer service representative for a security company, or some other suitable type of user. As depicted, seed query 320 can be interpreted using query interpretation components 322 and query expansion components 324. These two components are examples of components that may be implemented in query processor 118 in FIG. 1.

Seed query 320 is processed by query interpretation component 322. As depicted, query interpretation components 322 perform query segmentation on seed query 320 in which seed query 320 is stemmed, refined, and tokenized into atomic keywords. Query interpretation components 322 also can perform query alteration on a structural level which enriches seed query 320 by the associated concepts derived from mining the graph of semantically-related security data in security data embeddings 304.

For example, seed query 320 can be seed query Q={$c_1$, $c_2$, . . . , $c_m$} where cm represents the mth atomic keywords of Q. Query interpretation components 322 can identify a subset of concepts cz∈C from the weighted graph of security data G (V, E), which are similar to Q, given a specific minimum similarity threshold, such that:

$$c_z = \{e \in E, \forall i \neq j, \omega(e_{i,j}) \geq \theta\}$$

where ei,j indicates the edge between two keywords ci and cj in seed query Q; and indicates the similarity degree of these two keywords. This approach utilized by query interpretation component 322 interprets seed query 320 identifying a set of most similar concepts associated with the query keywords so as to retrieve the most relevant issues from repository 326 of the security information. Thus, seed query 320 can be is enriched and interpreted as follows:

$$Q^i = \{c_1, c_2, \ldots, c_m\} \cup c_z$$

Additionally, the interpretation also may include query expansion by query expansion component 324. This component accesses query log embeddings 316, which are utilized to expand seed query 320 with additional terms that match additional security issues. As a result, improvement in the relevancy of results 328 sent to user 318 from security information retrieved from repository 326 is enabled.

The illustration of security information environment 100 and the different components in this environment shown in FIGS. 1-3 are not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, query processor 118, model generator 120, and mining system 122 are shown as components within security information system 106. In another illustrative example, one or more these components may be considered part of another block. For example, mining system 122 may be located in a separate functional block from query processor 118 and model generator 120. Further, the implementation of security information system 106 in computer system 108 may occur in a number of different ways. For example, these components may all be located in the same data processing system in computer system 108. In another illustrative example, one or more of these components in security information system 106 may be located in a different data processing system from other components in security information system 106.

As another example, security information 104 in FIG. 1 can be located in a number of different locations. For example, security management may be located in a storage system, located within unified representation model 126, or in some other suitable location.

Figure 4:
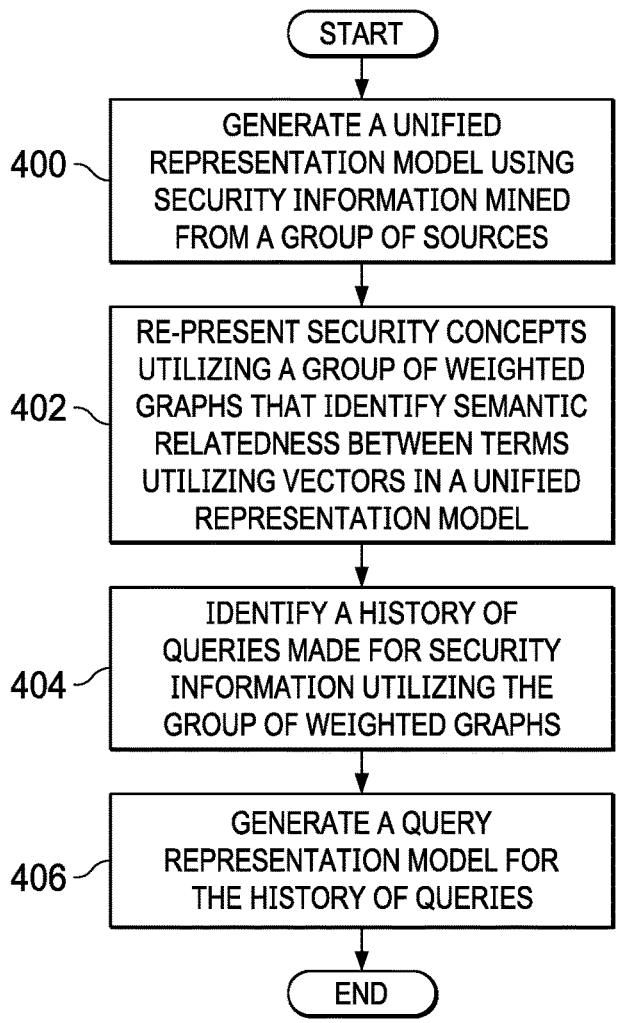
FIG. 4 is a flowchart of a process for ambiguity resolution in retrieving security information in accordance with an illustrative embodiment.

Turning next to FIG. 4, a flowchart of a process for ambiguity resolution in retrieving security information is depicted in accordance with an illustrative embodiment. The different steps in FIG. 4 can be implemented in at least one of hardware or software. This may be implemented in model generator 120 in security information system 106 in FIG. 1. This process illustrates the creation of models that can be used to reduce ambiguity in treating security information. When implemented in software, the steps can be implemented in program code that are run by one or more processing units in computer system 108 in FIG. 1.

The process begins by generating a unified representation model using security information mined from a group of sources (step 400). In step 400, the security information is processed utilizing a word-embedding technique to embed the terms utilizing the vectors. The unified representation model represents terms in the security information utilizing vectors that describe locations in space for the terms. The distances between the locations for the terms indicate correlations between the terms. In the illustrative example, the terms are for security concepts in the security information.

In the illustrative example, the creation of vectors can be performed using word embedding. Word embedding is a technique in which terms such as words or phrases are mapped to vectors of real numbers. This type of mapping may be performed utilizing language modeling and features learning techniques in natural language processing. Word embedding can be performed using artificial intelligence systems such as neural networks.

The process re-presents security concepts utilizing a group of weighted graphs that identify semantic-relatedness between terms utilizing vectors in a unified representation model (step 402). The group of weighted graphs enables interpreting queries with reduced ambiguity. The manner in which edges are created for notes may be performed in a number of different ways. For example, a threshold may be used to identify the distance between terms that should be used to create an edge. For example, a minimum threshold distance may be utilized to determine when an edge is created between two nodes. In another example, the top five closest terms to a selected term may be used to create edges connecting the node for the selected term to nodes for the nine other terms.

The process also identifies a history of queries made for security information utilizing the group of weighted graphs (step 404). The process generates a query representation model for the history of queries (step 406). The process terminates thereafter. In step 406, the queries are represented utilizing vectors. The process in step 406 embeds each word into a vector and also can embed all of the terms in a query into a vector.

Figure 5:
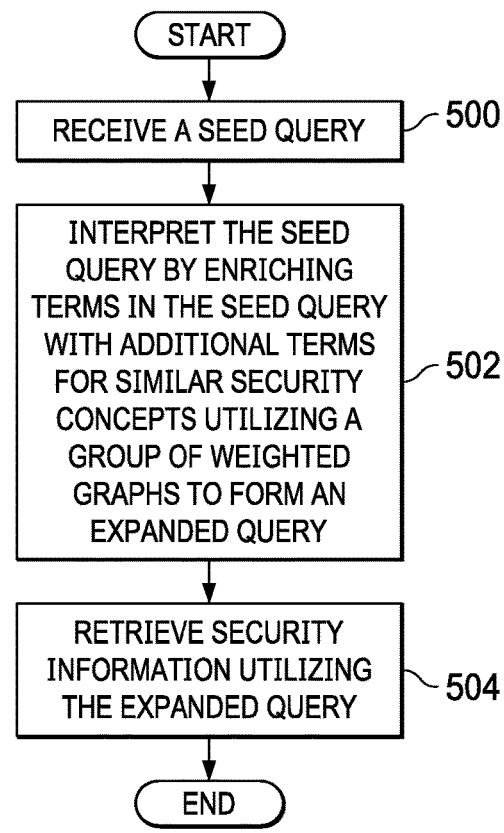
FIG. 5 is a flowchart of a process for processing queries in accordance with an illustrative embodiment.

With reference next to FIG. 5, a flowchart of a process for processing queries is depicted in accordance with an illustrative embodiment. The different steps in FIG. 5 can be implemented in at least one of hardware or software. This may be implemented in query processor 118 in security information system 106 in FIG. 4. This process illustrates the creation of models that can be used to reduce ambiguity in treating security information.

The process begins by receiving a seed query (step 500). In step 500, the seed query can be, for example, without limitation, "cross-site scripting security web application." The process interprets the seed query by enriching terms in the seed query with additional terms for similar security concepts utilizing a group of weighted graphs to form an expanded query (step 502). The weighted graphs can be used in step 502 to identify other terms that represent the same concept. These terms identified using the weighted graphs can be added to the seed query.

The seed query in an enriched form can be "cross-site scripting security web application, Stored XSS Attacks, Reflected XSS Attacks, XSS vulnerabilities". The number of terms identified from the weighted graphs can be selected any number of ways. For example, the number terms may be selected as the top five terms identified from the weighted graphs. These top five terms would be terms having edges that have the five highest values. The process then retrieves security information utilizing the expanded query (step 504). The process terminates thereafter.

Figure 6:
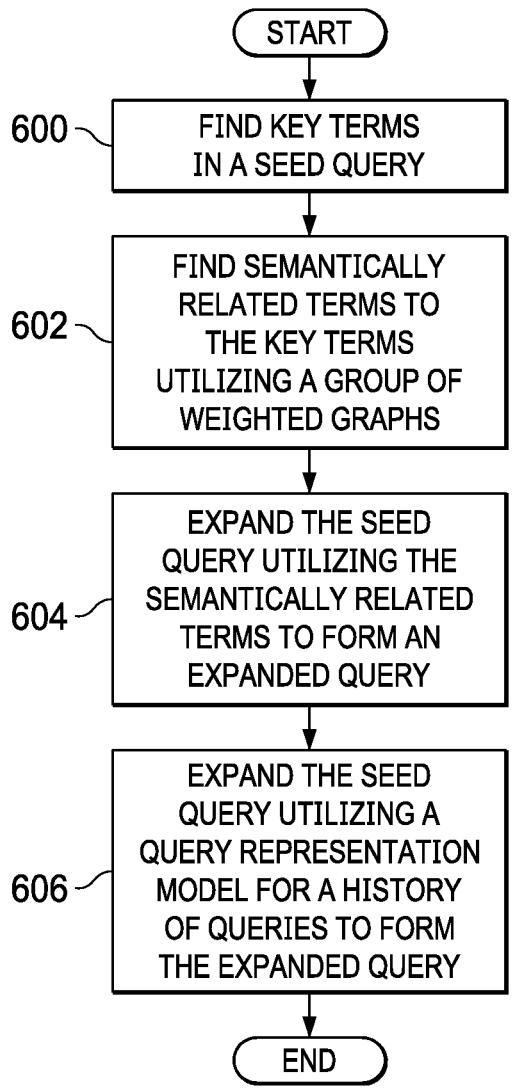
FIG. 6 is a flowchart of a process for interpreting a seed query in accordance with an illustrative embodiment.

Turning to FIG. 6, a flowchart of a process for interpreting a seed query is depicted in accordance with an illustrative embodiment. The steps in this process are an example of one implementation for step 502 in FIG. 5.

The process begins by finding key terms in a seed query (step 600). In step 600, identifying key terms may be performed using a number of different techniques. For example, tokenizing and stemming the keywords can be used to identify key terms in the seed query. For example, the seed query is "cross-site scripting security for a web application." The key terms identified in the seed query are "cross-site scripting security web application." The process finds semantically-related terms to the key terms utilizing a group of weighted graphs (step 602). In step 602, the process converts key terms into vectors and performs a search of semantically-related terms using the vectors. The process expands the seed query utilizing the semantically-related terms to form an expanded query (step 604). Additionally, the process also expands the seed query utilizing a query representation model for a history of queries to form the expanded query (step 606). The process terminates thereafter.

In step 600, the process compares the difference in distance between vectors to find the related vectors for related queries. How related queries are is based on the distance between the vectors representing the queries. In one example, the number of queries identified can be based on the top three queries. In this example, the distance is identified using vectors. In other examples, a weighted graph or other approach may be used to search for related terms. For example, a database identifying distances between terms could be used. In this illustrative example, the process may omit one of step 604 or step 606 in some illustrative examples.

Figure 7:
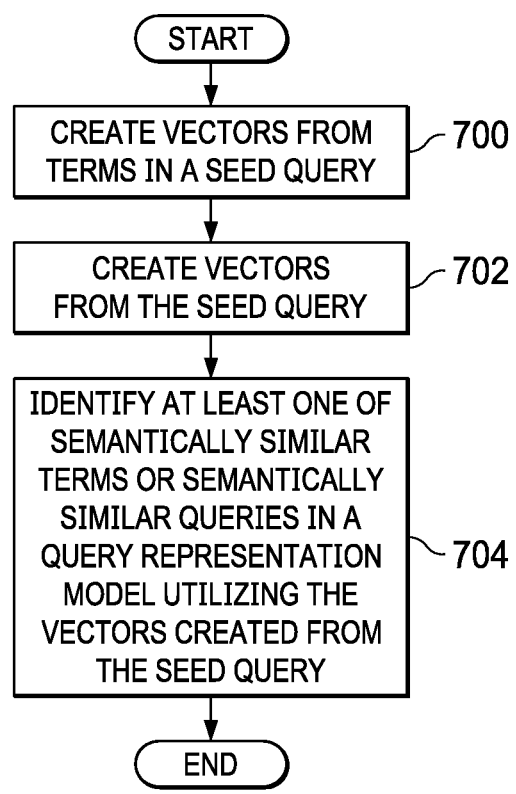
FIG. 7 is a flowchart of a process for interpreting a seed query in accordance with an illustrative embodiment.

Turning to FIG. 7, a flowchart of a process for interpreting a seed query is depicted in accordance with an illustrative embodiment. The steps in this process may be an example of another implementation for step 502 in FIG. 5.

The process creates vectors from terms in a seed query (step 700). The vectors are numbers representing a location of the terms in space. The process also creates vectors from the seed query (step 702). In step 702, all of the terms in the seed query are converted into vectors. All of the terms can also be converted into a vector. The process identifies at least one of semantically-related terms or semantically-related queries in a query representation model utilizing the vectors created from the seed query (step 704). The process terminates thereafter.

With a seed query "cross-site scripting security web application," semantically related queries may include, for example, "XSS attack in application security" and "Browser code injection in web application." The identification of when another query is similar enough in step 704 can be performed in a number of different ways. The identification is based on a threshold with respect to distances between vectors that represent the queries. The threshold may be, for example, a percentage, such as ninety percent. This percentage may be used when many queries are present. A lower percentage may use when fewer queries are present.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks may be implemented as program code, hardware, or a combination of the program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware. Each block in the flowcharts or the block diagrams may be implemented using special purpose hardware systems that perform the different operations or combinations of special purpose hardware and program code run by the special purpose hardware.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

Figure 8:
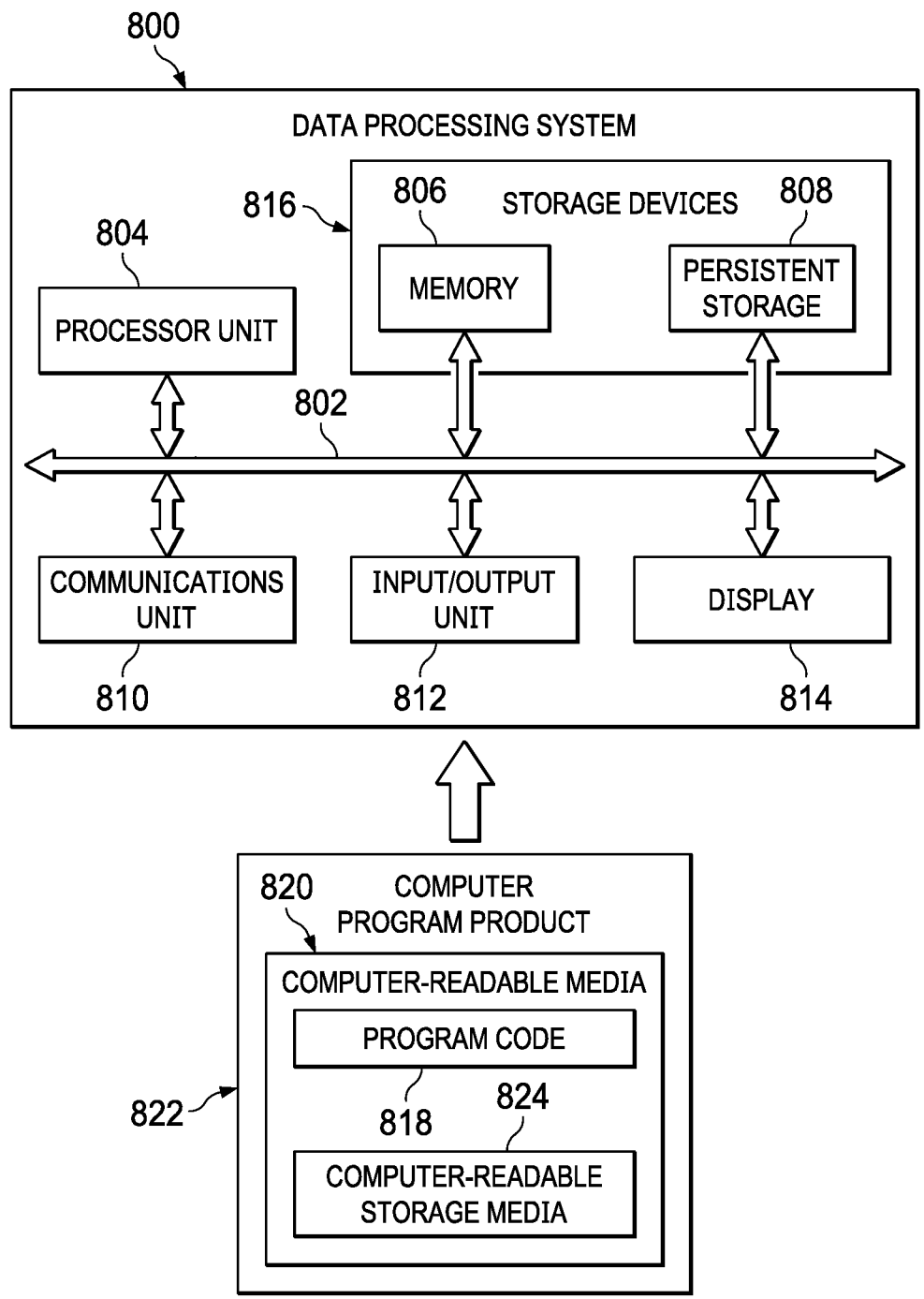
FIG. 8 is a block diagram of a data processing system in accordance with an illustrative embodiment.

Turning now to FIG. 8, a block diagram of a data processing system is depicted in accordance with an illustrative embodiment. Data processing system 800 may be used to implement computer system 108 in FIG. 1. In this illustrative example, data processing system 800 includes communications framework 802, which provides communications between processor unit 804, memory 806, persistent storage 808, communications unit 810, input/output (I/O) unit 812, and display 814. In this example, communications framework 802 may take the form of a bus system.

Processor unit 804 serves to execute instructions for software that may be loaded into memory 806. Processor unit 804 may be a number of processors, a multi-processor core, or some other type of processor, depending on the particular implementation.

Memory 806 and persistent storage 808 are examples of storage devices 816. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 816 may also be referred to as computer-readable storage devices in these illustrative examples. Memory 806, in these examples, may be, for example, a random-access memory or any other suitable volatile or non-volatile storage device. Persistent storage 808 may take various forms, depending on the particular implementation.

For example, persistent storage 808 may contain one or more components or devices. For example, persistent storage 808 may be a hard drive, a solid state hard drive, a flash memory, a rewritable optical disk, a rewritable magnetic tape, or some combination of the above. The media used by persistent storage 808 also may be removable. For example, a removable hard drive may be used for persistent storage 808.

Communications unit 810, in these illustrative examples, provides for communications with other data processing systems or devices. In these illustrative examples, communications unit 810 is a network interface card. Input/output unit 812 allows for input and output of data with other devices that may be connected to data processing system 800. For example, input/output unit 812 may provide a connection for user input through at least one of a keyboard, a mouse, or some other suitable input device. Further, input/output unit 812 may send output to a printer. Display 814 provides a mechanism to display information to a user.

Instructions for at least one of the operating system, applications, or programs may be located in storage devices 816, which are in communication with processor unit 804 through communications framework 802. The processes of the different embodiments may be performed by processor unit 804 using computer-implemented instructions, which may be located in a memory, such as memory 806.

These instructions are referred to as program code, computer usable program code, or computer-readable program code that may be read and executed by a processor in processor unit 804. The program code in the different embodiments may be embodied on different physical or computer-readable storage media, such as memory 806 or persistent storage 808.

Program code 818 is located in a functional form on computer-readable media 820 that is selectively removable and may be loaded onto or transferred to data processing system 800 for execution by processor unit 804. Program code 818 and computer-readable media 820 form computer program product 822 in these illustrative examples. In the illustrative example, computer-readable media 820 is computer-readable storage media 824.

In these illustrative examples, computer-readable storage media 824 is a physical or tangible storage device used to store program code 818 rather than a medium that propagates or transmits program code 818. Alternatively, program code 818 may be transferred to data processing system 800 using a computer-readable signal media. The computer-readable signal media may be, for example, a propagated data signal containing program code 818. For example, the computer-readable signal media may be at least one of an electromagnetic signal, an optical signal, or any other suitable type of signal. These signals may be transmitted over at least one of communications links, such as wireless communications links, optical fiber cable, coaxial cable, a wire, or any other suitable type of communications link.

The different components illustrated for data processing system 800 are not meant to provide architectural limitations to the manner in which different embodiments may be implemented. The different illustrative embodiments may be implemented in a data processing system including components in addition to or in place of those illustrated for data processing system 800. Other components shown in FIG. 8 can be varied from the illustrative examples shown. The different embodiments may be implemented using any hardware device or system capable of running program code 818.

Thus, illustrative embodiments provide a computer-implemented method, a computer system, and a computer program product for reducing ambiguity in retrieving security information. One or more illustrative examples provide a technical solution in which different terms for the same security concepts can be identified in a seed query made by a user. These terms can be added to the seed query to enrich the seed query to form an expanded query. This expanded query enables returning additional security information that may not be returned when using only the seed query.

In the illustrative examples, terms are represented using vectors. The vectors identify the location of the terms' space. This location may be any number of dimensions. The distance between terms can be used to identify the correlation between the terms and the security concepts that those terms represent. In this manner, the security information system enables to search for information about various security concepts even though those security concepts are referenced using different terms. As a result, the issues with searching for security information with a lack of a unified terminology, taxonomy, ontology, or classification system can be reduced through the ambiguity resolution provided by the different illustrative examples.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for ambiguity resolution in retrieving security information, the method comprising:
generating, by a computer system, a unified representation model utilizing the security information mined from a group of sources, wherein the unified representation model represents terms in the security information using vectors that describe locations in space for the terms, wherein distances between the terms indicate correlations between the terms, and wherein the terms are for security concepts in the security information;
representing, by the computer system, the security concepts utilizing a group of weighted graphs that identifies semantic relatedness between the terms utilizing the vectors in the unified representation model, wherein the group of weighted graphs enables interpreting queries with reduced ambiguity;
interpreting, by the computer system, a seed query utilizing the group of weighted graphs; and
retrieving, by the computer system, a portion of the security information utilizing the seed query interpreted utilizing the group of weighted graphs.

2. The method of claim 1 further comprising:
receiving, by the computer system, the seed query; and
wherein interpreting the seed query utilizing the group of weighted graphs comprises:
interpreting, by the computer system, the seed query by enriching key terms in the seed query with additional terms for similar security concepts utilizing the group of weighted graphs.

3. The method of claim 2, wherein interpreting, by the computer system, the seed query by enriching the key terms of the seed query with the additional terms for the similar security concepts utilizing the group of weighted graphs comprises:
finding, by the computer system, the key terms in the seed query;
finding, by the computer system, semantically-related terms to the key terms utilizing the group of weighted graphs; and
expanding, by the computer system, the seed query utilizing the semantically-related terms.

4. The method of claim 1 further comprising:
recording, by the computer system, a history of queries made for the security information utilizing the group of weighted graphs; and
generating, by the computer system, a query representation model for the history of queries, wherein the queries are represented utilizing the vectors to describe the locations in the space for the queries in the history of queries.

5. The method of claim 4 further comprising:
responsive to the computer system receiving the seed query, expanding, by the computer system, the seed query utilizing the query representation model for the history of queries to form an expanded query; and retrieving, by the computer system, a portion of the security information from the query representation model utilizing the expanded query.

6. The method of claim 5, wherein the expanded query incorporates similar queries from the query representation model.

7. The method of claim 1 further comprising:
mining, by the computer system, the security information and the terms used in relation to application security in an unsupervised manner from unstructured information available in the group of sources.

8. The method of claim 1, wherein generating the unified representation model utilizing the security information mined from the group of sources comprises:
processing, by the computer system, the security information utilizing a word-embedding technique to embed the terms utilizing the vectors.

9. The method of claim 1, wherein the group of sources comprises at least one of repositories of a security management system, reference web sites in a field of security, security blogs, security forums, or security databases.

10. A security information system comprising:
a computer system comprising a processor and a memory, wherein the memory comprises program code that is executable by the processor to perform steps of:
generating, by the computer system, a unified representation model utilizing the security information mined from a group of sources, wherein the unified representation model represents terms in the security information using vectors that describe locations in space for the terms, wherein distances between the terms indicate correlations between the terms, and wherein the terms are for security concepts in the security information;
representing, by the computer system, the security concepts utilizing a group of weighted graphs that identifies semantic relatedness between the terms utilizing the vectors in the unified representation model, wherein the group of weighted graphs enables interpreting queries with reduced ambiguity;
interpreting, by the computer system, a seed query utilizing the group of weighted graphs; and
retrieving, by the computer system, a portion of the security information utilizing the seed query interpreted utilizing the group of weighted graphs.

11. The security information of claim 10, wherein in interpreting the seed query by enriching the terms of the seed query with the similar security concepts utilizing the group of weighted graphs of the semantically-related security concepts, the query processor finds key terms in the seed query; finds semantically-related terms to the key terms utilizing the group of weighted graphs; and expands the seed query utilizing the semantically-related terms.

12. The security information of claim 10 further comprising:
a model generator, running on the computer system, wherein the model generator generates a query representation model for a history of queries, wherein queries are represented utilizing the vectors to describe the locations in the space for the queries in the history of queries, and wherein the query processor, responsive to receiving the seed query, utilizes the unified representation model and the query representation model to form an expanded query.

13. The security information of claim 12, wherein the expanded query incorporates similar queries from the query representation model.

14. The security information of claim 10 further comprising:
a mining system that mines the security information and the terms in the security information used in relation to application security in an unsupervised manner from unstructured information available in a group of sources.

15. A computer program product for ambiguity resolution in retrieving security information, the computer program product comprising:
a computer-readable storage media;
first program code, stored on the computer-readable storage media, for generating a unified representation model using security information mined from a group of sources, wherein the unified representation model represents terms in the security information using vectors that describe locations in space for the terms wherein distances between the terms indicate correlations between the terms, and wherein the terms are for security concepts in the security information;
second program code, stored on the computer-readable storage media, for representing the security concepts utilizing a group of weighted graphs that identifies semantic-relatedness between the terms utilizing the vectors in the unified representation model, wherein the group of weighted graphs enables interpreting queries with reduced ambiguity;
third program code, stored on the computer-readable storage media, for interpreting a seed query utilizing the group of weighted graphs; and
fourth program code, stored on the computer-readable storage media, for retrieving a portion of the security information utilizing the seed query interpreted utilizing the group of weighted graphs.

16. The computer program product of claim 15 further comprising:
fifth program code, stored on the computer-readable storage media, for receiving the seed query; and
sixth program code, stored on the computer-readable storage media, for interpreting the seed query by enriching key terms in the seed query with additional terms for similar security concepts utilizing the group of weighted graphs.

17. The computer program product of claim 16, wherein the sixth program code comprises:
program code, stored on the computer-readable storage media, for finding the key terms in the seed query;
program code, stored on the computer-readable storage media, for finding semantically-related terms to the key terms utilizing the group of weighted graphs; and
program code, stored on the computer-readable storage media, for expanding the seed query utilizing the semantically-related terms.

18. The computer program product of claim 15 further comprising:
fifth program code, stored on the computer-readable storage media, for recording a history of queries made for the security information utilizing the group of weighted graphs; and
sixth program code, stored on the computer-readable storage media, for generating a query representation model for the history of queries, wherein queries are represented utilizing the vectors to describe the locations in the space for the queries in the history of queries.

19. The computer program product of claim 18 further comprising:
- seventh program code, stored on the computer-readable storage media, responsive to receiving the seed query, for expanding the seed query utilizing the query representation model for the history of queries to form an expanded query; and
- eighth program code, stored on the computer-readable storage media, for retrieving a portion of the security information from the query representation model utilizing the expanded query.

* * * * *